United States Patent Office 3,409,660
Patented Nov. 5, 1968

3,409,660
BENZYL SULFONIUM SALTS
William G. Lloyd, Dover, N.J., assignor to The Dow
Chemical Company, Midland, Mich., a corporation of
Delaware
No Drawing. Continuation-in-part of application Ser. No.
260,300, Feb. 21, 1963. This application Aug. 15, 1966,
Ser. No. 572,178
8 Claims. (Cl. 260—470)

ABSTRACT OF THE DISCLOSURE

New benzyl sulfonium salts have been prepared which are active cationic surfactants, readily and irreversibly converted into an inert, hydrophobic residue by heating or drying.

---

This is a continuation-in-part of application Ser. No. 260,300 filed on Feb. 21, 1963, by William G. Lloyd, now abandoned.

This invention relates to water-soluble cationic surfactants which are readily and irreversibly converted into inert, hydrophobic residues upon being heated or dried. More specifically it concerns new benzyl sulfonium salts which combine the hydrophobic properties of certain substituent groups with a thermally sensitive methylenesulfonium group to obtain a cationic surfactant which can be irreversibly converted into an inert hydrophobic residue by heating or drying.

Organic surfactants are widely used to provide stable aqueous emulsions for such commercial products as paper sizing, floor waxes, latex paints, and heavy-duty laundry compositions. The advantages of water-based systems are reflected in the ready consumer acceptance of these products.

In many applications it is desirable to form a water-resistant protective film by drying such an emulsion. Yet the water-resistance of such films is inherently weakened by the hydrophilic character of the surfactant retained in the film. Also in emulsion polymerization processes, it would be advantageous at times to replace one surfactant with another if the initial surfactant could be removed or destroyed. For example, a surfactant that is desirable during latex polymerization may not be suitable for stabilization of the final product for storage.

It has now been discovered that certain water-soluble benzyl sulfonium salts are active surfactants which can be readily and irreversibly converted into non-polar and hydrophobic residues which have negligible surfactant properties. These water-soluble sulfonium salts have the formula:

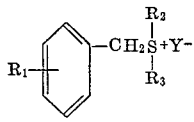

wherein (1) $R_1$ is a $C_4$–$C_{16}$ alkyl group and $R_2$ and $R_3$ are independently a $C_1$–$C_4$ alkyl or $C_2$–$C_4$ hydroxyalkyl group; or (2) $R_1$ is a $C_2$–$C_{16}$ alkyl group, $R_2$ is a $C_1$–$C_4$ alkyl group, and $R_3$ is a group of the formula:

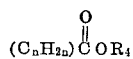

wherein $R_4$ is a $C_1$–$C_6$ alkyl group, and $n$ is an integer from 1 to 4; and Y is a counteranion. These fugitive cationic surfactants are easily prepared in an aqueous solution suitable for use in conventional latex polymerization processes. These sulfonium salts have in common the property of readily and irreversibly degrading upon heating or drying to form an inert hydrophobic residue. However, by varying the substituent groups within the stated range, salts with varying surfactant characteristics and thermal stabilities can be obtained thus permitting selection of the properties most suitable for a given application.

The term "water-soluble" as employed herein means dispersible in water to provide a visually homogeneous and substantially transparent solution infinitely dilutable with water.

The novel fugitive cationic surfactants described herein are conveniently prepared by reacting a suitable alkylbenzyl halide with an appropriate organic sulfide according to the equation:

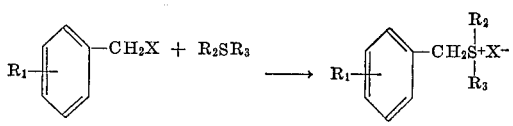

wherein $R_1$, $R_2$ and $R_3$ are as defined above, and X is chlorine or bromine. It has been found that when $R_2$ and $R_3$ are $C_1$–$C_4$ alkyl or $C_2$–$C_4$ hydroxyalkyl groups $R_1$ must be at least a $C_4$ and preferably a $C_8$–$C_{12}$ alkyl group for active surfactant properties. But when $R_3$ is an acyloxyalkyl group, e.g. —$C_nH_{2n}COOR_4$, effective surfactant properties are achieved when $R_1$ is a $C_2$ or higher alkyl group.

Many organic sulfides suitable for the synthesis of these sulfonium salts are commercially available, such as dimethyl sulfide, diethyl sulfide and thiodiglycol. Others can be prepared by known methods. For example, several syntheses for 3-alkylthiopropionic esters are given by Rapoport et al., J. Am. Chem. Soc., 69, 693 (1947). The addition of an alkyl mercaptan to an acrylic or methacrylic ester is particularly suitable for the purposes of the present invention. For ease of synthesis, an organic sulfide with at least one alkyl group containing not more than two carbons is preferred.

Reaction of the alkylbenzyl halide and organic sulfide is advantageously carried out in water or a similar polar hydroxylic solvent such as a $C_1$–$C_4$ alcohol or glycol or aqueous solution thereof. By using an aqueous solvent and substantially stoichiometric proportions of the reactants, i.e., about 0.9–1.1 mole of organic sulfide per mole of benzyl halide, aqueous solutions containing 20–30 wt. percent or more of the sulfonium salts can be prepared. Such solutions can be used as a concentrate of the surfactant in many applications without isolation or purification of the sulfonium salt.

This process for preparing the sulfonium salts is usually carried out about 20°–70°C. At much lower temperatures, the reaction rate is generally too slow for practical purposes. At temperatures appreciably higher than about 70°C., competing reactions of the benzyl halide and solvent occur. Also, many of the resulting benzyl sulfonium salts are not thermally stable at a temperature greater than about 70° C. Reaction at room temperature with substantially stoichiometric proportions of the reactants may require from several hours to several weeks to achieve essentially complete conversion. However, the extent of the reaction is readily followed by analysis of the reaction mixture for ionic halide. Competing solvolysis is detected by titration for by-product acid.

Normally, the sulfonium salt prepared as described above will have a chloride or bromide counteranion. But if desired, the halide sulfonium salt can be converted to another anionic salt by standard techniques such as passing a solution of the water-soluble sulfonium halide through an anion exchange column in the desired salt form. Other common counteranions which may be employed include such inorganic and organic anions as fluoride, iodide, sulfate, nitrate, bicarbonate, carbonate, acetate, propionate, etc. Generally monovalent anions are most convenient, although the nature of the counteranion is not critical provided that the sulfonium salt is water-soluble.

Other methods for the synthesis of these sulfonium salts will be apparent in light of this disclosure to those skilled in the art.

The thermal stability of the claimed sulfonium salts depends upon their exact structure. While dilute solutions of the salts are generally stable at room temperature, isolation and purification of the salts even by such techniques as freeze drying is often difficult. Fortunately, for many purposes the initial salt solutions can be used. But even in dilute solution these sulfonium salts are generally thermally unstable at temperatures greater than about 70° C. For example, heating a 0.175 M (6.3 wt. percent) solution of dimethyl(p-dodecylbenzyl)sulfonium chloride in deionized water for 8 hours at 90° C. destroyed about 90% of the original surfactant activity as shown by surface tension measurements. The thermal stability of other salts is similar, although there is sufficient variation so that appropriate fugitive cationic surfactants can be selected for varied applications and conditions.

The exact nature of the thermal conversion of these sulfonium salts from active surfactants to essentially inert hydrophobic materials is not fully understood. However an alkylbenzyl alcohol and alkyl sulfide have been recovered and identified after heating a salt in aqueous solution.

The novel heat labile or fugitive sulfonium surfactants described herein have many applications. Particularly important is their use as surfactants in aqueous film-forming emulsions which because the surfactant can be destroyed when the film is dried give films with improved water resistance. These characteristics are highly advantageous in many products and processes such as the application of water repellant textile finishes, textile sizing, paper coatings, and in latex paint and wax formulations.

The invention disclosed herein will be further illustrated by the following representative specific embodiments which set forth the best mode contemplated by the inventor of carrying out his invention. Unless otherwise specified, all parts and percentages are by weight.

Example 1. — Dimethyl(p - dodecylbenzyl)sulfonium chloride (I)

(A) To an aqueous mixture of 6.21 g. (0.1 mole) of dimethyl sulfide was added 29.5 g. (0.1 mole) of p-dodecylbenzyl chloride. After diluting to 100 ml., the heterogeneous mixture was shaken at room temperature for 2 to 3 weeks to obtain a clear, homogeneous solution. The conversion as determined by analysis for ionic chloride was essentially complete. Titration for by-product acid indicated less than 1% hydrolysis.

In subsequent preparations methanol and mixtures of methanol and water have been used to give a more homogeneous solution throughout the reaction period. Using equimolar amounts of 1 N solutions of dimethyl sulfide and p-dodecylbenzyl chloride in methanol, the reaction to form the sulfonium chloride (I) was 81% complete in 48 hours.

Visible evidence of the surfactant properties of the sulfonium solutions was the appreciable foaming observed when the mixtures were shaken during synthesis. Further evidence of surfactant activity is provided by the surface tension data given in Table 1. These data were obtained with a DuNuoy tensiometer using standard procedures and appropriate dilutions of an aqueous solution of the sulfonium chloride (I).

TABLE 1.—SURFACE TENSION OF AQUEOUS SOLUTIONS OF DIMETHYL(P-DODECYLBENZYL)SULFONIUM CHLORIDE

| Conc.; M×10³ | 0 | 0.039 | 0.078 | 0.156 | 0.312 |
|---|---|---|---|---|---|
| Dynes/cm | 75.2 | 70.1 | 65.2 | 55.8 | 51.0 |
| Conc.; M×10³ | 0.625 | 1.25 | 2.50 | 5.00 | |
| Dynes/cm | 47.0 | 42.3 | 37.8 | 34.6 | |

(B) To establish the fugitive nature of this surfactant, a 0.175 molar solution of I in deionized water was heated in a constant temperature bath at 90° C. Samples were removed at various time intervals, cooled, diluted to a standard concentration of 0.006 M and the surface tension determined. Over a period of 8 hours, the surface tension increased from the minimum value of 36.7 dynes/cm. to a value of 48.5 dynes/cm. Comparison of these data with a calibration curve prepared from Table 1 indicates that about 75% of the original surfactant was destroyed in 4 hours heating and about 90% in 8 hours.

(C) The fugitive nature of this surfactant was also shown in a test measuring the amount of a 0.175 M solution of I required to coagulate and flocculate 100 ml. portions of a 0.5 wt. percent bentonite slurry. The unheated solution was highly effective, 0.10 ml. bringing about flocculation. However, after 4 hours heating at 90° C., 0.20 ml. was required, and after 16 hours heating 0.50 ml. was still insufficient to flocculate the standard clay suspension.

(D) Using a styrene-butadiene latex prepared with 2-aminoethyl methacrylate hydrochloride as a built-in surfactant, a latex which has the property of irreversibly coagulating upon exposure to ammonia vapors in the absence of another cationic or non-ionic surfactant, the thermal degradation of the fugitive cationic emulsifier was further demonstrated. One drop of the 0.175 M solution of I prevented coagulation of a 4.00 ml. sample of the latex on exposure to ammonia. After 30 minutes heating at 90° C., 2 drops of the fugitive surfactant were required, and after 16 hours heating, even 15 drops were insufficient to inhibit the latex coagulation.

Example 2.—Dimethyl(p-ethylbenzyl)sulfonium chloride (II)

In a manner similar to that described in Example 1, dimethyl(p-ethylbenzyl)sulfonium chloride was prepared by shaking an aqueous solution containing 6.21 g. (0.1 mole) of dimethyl sulfide and 15.45 g. (0.1 mole) of p-ethylbenzyl chloride. The final clear aqueous solution showed little visible surfactant characteristics upon shaking. The surface tension of a 0.05 M solution was 51.1 dynes/cm., and there was no appreciable change after 20 hours of heating at 90° C. Clearly, this material, outside the scope of this invention, does not display the desired fugitive cationic surfactant properties.

Example 3.—p-Butylbenzyldimethylsulfonium chloride (A) To illustrate an alternate synthesis, 25 parts (0.152 mole) of p-butylbenzyl alcohol was stirred with 29 parts (0.152 moles) of p-toluenesulfonic acid monohydrate and 43.7 parts (0.7 moles) of dimethylsulfide for 6 days at room temperature. Then 250 parts of water was added to extract the water-soluble product. After extracting the aqueous phase three times with benzene, the aqueous solution was concentrated in vacuo to a total of 220 parts. This aqueous concentrate was passed through a bed of quaternary ammonium anion-exchange resin in OH⁻ form and then neutralized with HCl to give an aqueous solution 0.613 N in p-butylbenzyldimethylsulfonium chloride.

(B) As an initial test of the emulsifying action of p-butylbenzyldimethylsulfonium chloride, the following mixtures were prepared in 25 ml. volumetric flasks:

(a) 25 ml. $H_2O$+1 ml. toluene;

(b) 12.5 ml. of 0.163 N butylbenzyldimethylsulfonium chloride+12.5 ml. $H_2O$+1 ml. toluene; and (c) 25 ml. of 0.163 N butylbenzyldimethylsulfonium chloride+1 ml. toluene.

On shaking slight foaming was observed with solutions (b) and (c). Solubilization of toluene (c) was too small to detect and the mixtures underwent rapid phase separation on standing. In contrast mixtures of toluene with dilute aqueous dodecylbenzyldimethylsulfonium chloride (I) exhibited strong foaming, delayed phase separation, and measurable solubilization of toluene into the aqueous phase. When benzyldimethylsulfonium chloride was similarly tested foaming was very low, visually appreciably less than even with the p-butylbenzyl derivative.

(C) As a further test of surfactant activity, a series of emulsion polymerizations were carried out at 50° C. using 25 parts styrene, 3.3 parts of 30% $H_2O_2$ and varying amounts of the aqueous benzylsulfonium salts. Results of three experiments using as the aqueous phase 50 parts of a 3.7% aqueous solution of the indicated sulfonium salts are given in Table 2.

TABLE 2.—EMULSION POLYMERIZATION TESTS

| Run | Sulfonium Salt $ArCH_2SMe_2Cl$ | Polymerization Conditions | Results |
|---|---|---|---|
| 2-1 | p-Dodecylbenzyl (I) | 16 hrs; 50° C | Good latex. |
| 2-2 | p-Butylbenzyl (III) | 128 hrs; 50° C[1] | Moderately cloudy aqueous phase. |
| 2-3 | Benzyl (IV) | 128 hrs; 50° C[1] | Essentially clear aqueous phase. |

[1] Another 3.3 parts of 30% $H_2O_2$ was added after 16 hrs.

These results indicate that the dodecylbenzyldimethylsulfonium chloride is an effective polymerization emulsifier in the styrene-$H_2O_2$ system. Although the butylbenzyldimethylsulfonium chloride did not give extensive polymerization, the cloudy aqueous phase indicated formation of a small but definite amount of latex illustrating a low but definite degree of surfactant activity. This low degree of surfactant activity is further reduced by heating the aqueous p-butylbenzylsulfonium salts at 80°–90° C.

Example 4.—(2-carbomethoxyethyl)(p-ethylbenzyl)-methylsulfonium chloride (V)

(A) A mixture of 15.45 g. (0.1 mole) of p-ethylbenzyl chloride and 13.4 g. (0.1 mole) of methyl 3-methylthiopropionate in 100 ml. of 95% aqueous methanol was shaken for one hour at room temperature until the turbidity cleared and then allowed to stand for several weeks to insure complete reaction. By chloride analysis, the reaction was at least 96% complete.

(B) A sample of the above methanolic solution was diluted to 0.175 M for thermal stability study. This solution was heated at 90°C. with periodic sampling followed by dilution to about 0.005 M and measurement of the surface tension. The minimum surface tension was 43.2 dynes/cm. with an increase after 4 hours of heating to 49.9 dynes/cm. and after 16 hours to 53.1 dynes/cm., e.g., a loss of at least 80% of the initial surfactant activity in 16 hours.

(C) The surfactant properties of the sulfonium solution is further shown in a flocculation test with coal fines. Thus vigorous hand shaking of a mixture of 2.0 ml. of the initial methanolic solution of V, 18 ml. of water and 100 mg. of standard Peabody coal fines gives a suspension which separates into large flocs of coal fines and a clear supernatant liquor less than 15 seconds after the agitation is stopped. In a control experiment using 2.0 ml. of water for the sulfonium solution a suspension was obtained which was still dispersed after 30 minutes. Heating the solution of VI was prepared from equimolar amounts of Example 5.—(2-carbobutoxyethyl) (p-ethylbenzyl) methylsulfonium chloride (VI)

In a manner as described in Example 4A, a methanolic solution of VI was prepared from equimolar amounts of p-ethylbenzyl chloride and n-butyl 3-methylthiopropionate. A sample of this solution was diluted to 0.175 M with deionized water and the thermal stability at 90°C. was examined by surface tension measurements after a standard dilution to about 0.005 M. An increase from 48.0 to 54.3 dynes/cm. was found in 7 hours' heating. In the bentonite flocculation test as described in Example 1(C), 0.15 ml. of the 0.175 M solution of VI was required to achieve flocculation after one hour of heating at 90°C., 0.25 ml. after 8 hours, and 0.45 ml. after 20.5 hours' heating, thus indicating again the fugitive nature of these cationic surfactants.

I claim:
1. A water-soluble sulfonium salt of the formula:

$$R_1 - \underset{\text{benzene ring}}{\bigcirc} - CH_2 \overset{R_2}{\underset{R_3}{\overset{|}{S^+}}} Y^-$$

wherein
(1) $R_1$ is a $C_4$–$C_{16}$ alkyl group, and $R_2$ and $R_3$ are independently a $C_1$–$C_4$ alkyl or $C_2$–$C_4$ hydroxyalkyl group; or
(2) $R_1$ is a $C_2$–$C_{16}$ alkyl group, $R_2$ is a $C_1$–$C_4$ alkyl group, and $R_3$ is a group of the formula:

$$(C_nH_{2n})\overset{O}{\overset{\|}{C}}OR_4$$

wherein $R_4$ is a $C_1$–$C_6$ alkyl group, and $n$ is an integer from 1 to 4; and Y is an anion.

2. The sulfonium salt of claim 1 wherein $R_2$ is methyl.
3. The sulfonium salt of claim 1 wherein $R_1$ is a $C_8$–$C_{12}$ alkyl group.
4. The sulfonium salt of claim 3 wherein $R_1$ is dodecyl and $R_2$ and $R_3$ are methyl.
5. Dimethyl (p-dodecylbenzyl) sulfonium chloride.
6. The sulfonium salt of claim 1 wherein $R_1$ is ethyl, $R_2$ is methyl, and $R_3$ is —$CH_2CH_2COOR_4$.
7. The sulfonium salt of claim 1 wherein the counteranion is monovalent.
8. The sulfonium salt of claim 7 wherein the counteranion is chloride.

References Cited
UNITED STATES PATENTS 2,178,353  9/1939  Werntz ............ 260—607
2,193,963  3/1940  Harris ............. 260—607

OTHER REFERENCES
Mamalis, "J. Chem. Soc. (London)," 1960, pp. 4747–4753.
Reid, "Org. Chem. of Bivalent Sulfur," vol. II (1960), pp. 66–75.

LORRAINE A. WEINBERGER, *Primary Examiner.*

M. G. BERGER, *Assistant Examiner.*

UNITED STATES PATENT OFFICE
CERTIFICATE OF CORRECTION

Patent No. 3,409,660                                           November 5, 1968

William G. Lloyd

It is certified that error appears in the above identified patent and that said Letters Patent are hereby corrected as shown below:

Column 4, line 60, "0.613" should read -- 0.163 --. Column 5, cancel "VI was prepared from equimolar amounts of" and insert -- V destroys this flocculent activity --.

Signed and sealed this 10th day of March 1970.

(SEAL)
Attest:

Edward M. Fletcher, Jr.                                   WILLIAM E. SCHUYLER, JR.
Attesting Officer                                                  Commissioner of Patents